US012585025B1

(12) United States Patent　　　　(10) Patent No.:　US 12,585,025 B1
　　Dannenfeldt et al.　　　　　　　(45) Date of Patent:　Mar. 24, 2026

(54) SYSTEM AND METHOD FOR MONITORING THE USE OF SEED BOXES

(71) Applicant: P2 Services, LLC, Gurnee, IL (US)

(72) Inventors: Matt Dannenfeldt, Carlsbad, CA (US);
Joe Waldman, Shorewood, WI (US);
Quintin Bucher, Bushnell, IL (US);
Jake Henson, Macomb, IL (US);
Edward Gilbert, Evanston, IL (US)

(73) Assignee: P2 Services, LLC, Gurnee, IL (US)

( * ) Notice: Subject to any disclaimer, the term of this patent is extended or adjusted under 35 U.S.C. 154(b) by 960 days.

(21) Appl. No.: 17/805,943

(22) Filed: Jun. 8, 2022

Related U.S. Application Data

(60) Provisional application No. 63/208,536, filed on Jun. 9, 2021.

(51) Int. Cl.
　G01S 19/14　　　(2010.01)
　A01C 7/20　　　 (2006.01)
　G01N 35/00　　　(2006.01)
(52) U.S. Cl.
　CPC ............. G01S 19/14 (2013.01); A01C 7/208 (2013.01); G01N 35/00732 (2013.01); G01N 2035/00752 (2013.01)
(58) Field of Classification Search
　CPC .......... G01S 19/14; G01S 19/13; G01S 19/01; G01S 19/00; A01C 7/208; A01C 7/20; A01C 7/00; G01N 35/00732; G01N 35/00722; G01N 35/00584; G01N 35/00; G01N 2035/00752; G01N 2035/00742
　See application file for complete search history.

(56) References Cited

U.S. PATENT DOCUMENTS 2,870,980 A　　1/1959　Higgins
3,628,468 A　　12/1971　Angelbeck, Jr.
　　　　(Continued)

FOREIGN PATENT DOCUMENTS

CA　　　2656649 C　*　3/2012　...............　A01C 1/00

OTHER PUBLICATIONS

Bulk Container Express, "Buckhorn 57" x 45" x 65" Hopper Bottom Pro Box Bulk Seed Container + Cover", http://www.bulkcontainerexpress.com/p/BH574565-HB.html?gclid=CN_pt4jkyM0CFQuPaQodr_sOIA, (Jun. 27, 2016), Cincinnati, OH (admitted prior art).

(Continued)

*Primary Examiner* — Christopher J. Novosad
(74) *Attorney, Agent, or Firm* — Patzik, Frank & Samotny Ltd.

(57)　　　　　　ABSTRACT

A system and method for monitoring the location and usage of seed boxes. The system includes a sensor on the seed box slide gate and the seed box to detect when the slide gate is opened to discharge the seeds contained within the seed box. A GPS unit may be installed within the seed box to detect and transmit information on the seed box's location. The GPS unit may include a battery that permits it to operate and provide power to the sensor. The system also may utilize a RFID/barcode label on the box that stores information on the particular type of seeds contained therein. Each of the label, sensor and GPS unit preferably have unique identifiers that may be stored in a database to allow information received from the GPS unit from the sensor about the discharging of the seed to be associated with a particular seed box.

24 Claims, 10 Drawing Sheets

(56)                References Cited

U.S. PATENT DOCUMENTS

| | | | |
|---|---|---|---|
| 3,699,901 | A | 10/1972 | Cook |
| 5,295,445 | A | 3/1994 | Locke |
| 5,413,052 | A | 5/1995 | Breezer |
| 5,582,113 | A | 12/1996 | Angenbeck |
| 5,746,341 | A | 5/1998 | Olson |
| 5,967,057 | A | 10/1999 | Nakayama |
| 6,010,022 | A | 1/2000 | Deaton |
| 6,962,115 | B2 | 11/2005 | Markling |
| 6,976,437 | B2 | 12/2005 | Fisch |
| 7,475,796 | B2 | 1/2009 | Garton |
| 8,701,569 | B2 | 4/2014 | Linares |
| RE46,334 | E | 3/2017 | Oren |
| 9,809,381 | B2 | 11/2017 | Oren |
| 2002/0178973 | A1 | 12/2002 | Tan |
| 2004/0074922 | A1 | 4/2004 | Bothor |
| 2006/0180062 | A1 | 8/2006 | Furrer |
| 2006/0277783 | A1 | 12/2006 | Garton |
| 2008/0029553 | A1 | 2/2008 | Culleton |
| 2008/0053353 | A1 | 3/2008 | Werner |
| 2008/0277423 | A1 | 11/2008 | Garton |
| 2010/0065466 | A1 | 3/2010 | Perkins |
| 2010/0108711 | A1 | 5/2010 | Wietgrefe |
| 2010/0278621 | A1 | 11/2010 | Redekop |
| 2011/0127178 | A1 | 6/2011 | Claussen |
| 2011/0168593 | A1 | 7/2011 | Neufeld |
| 2011/0168702 | A1 | 7/2011 | Neufeld |
| 2012/0103848 | A1 | 5/2012 | Allegretti |
| 2012/0152798 | A1 | 6/2012 | Allegretti |
| 2014/0203046 | A1 | 7/2014 | Allegretti |
| 2015/0320235 | A1 | 11/2015 | Carlson |

OTHER PUBLICATIONS

Bulk Container Express, "Buckhom 30" X 32" Medium-Duty Container Lid", http://www.bulkcontainerexpress.com/ALL/TS323002. html, (Jun. 27, 2016), Cincinnati, OH (admitted prior art).

Material Flow, "CenterFlow Bulk Containers", https://presto-lift. com/p/CenterFlow-Bulk-Containers, (copyrighted 1999-2016), Donald, OR (admitted prior art).

* cited by examiner

SYSTEM AND METHOD FOR MONITORING THE USE OF SEED BOXES

RELATED APPLICATION

This application claims the benefit of U.S. provisional patent application Ser. No. 63/208,536, filed Jun. 9, 2021, the entirety of which is hereby incorporated by reference.

FIELD OF THE INVENTION

This invention relates to storage containers such as seed boxes, and more particularly to a system and method for monitoring the location and usage of seed boxes.

BACKGROUND OF THE INVENTION

Currently, just under 20% of all available land in the United States, or about 442 million acres, is used for crops. As most crops are annuals, meaning that they perform their entire life cycle in one season and must be replanted in future years, a large number of seeds must be planted each year. While there are now large scale seeders to assist farmers in the sowing process, farmers must still get the seeds from storage into the hoppers or seeders for planting. One way to do so is through seed boxes that store the seeds and provide for a discharge door to quickly expunge the seeds from storage for use.

FIGS. 1 through 4B show a prior art seed box 10, in particular a Buckhorn® CenterFlow™ container having a base 20, a ring 40 and a lid or top 60. While the container is referred to as a seed box, it is appreciated that it can be used for any number of flowable products other than seeds including, but not limited to, grains, golf balls or ground-up rubber. The seed box is made from a high density polyethylene (HDPE) material.

Referring to FIG. 2, the base is rectangularly shaped with side walls 22 extending upward to form a rectangular frame 24 and, with the bottom wall 25, defining an interior compartment 26. The interior compartment 26 includes smooth sides and is funnel-shaped with sloped or angled interior walls 28 to permit seeds or other flowable materials to flow toward a discharge door 30 on the bottom 25 of the base 20. The seeds are then selectively discharged when the discharge door is moved to the open position. In operation, the seed box may hold up to 2500 pounds of content and release such contents in about 30 seconds.

The ring 40 is rectangularly shaped with side walls 42 forming a rectangular frame and defining an interior compartment 46 that is sized so that the ring 40 may fit over and nest with the base 20.

FIGS. 4A and 4B show the discharge door or slide gate 30 of the seed box of FIG. 1 in closed and open positions, respectively. The slide gate 30 is sized to cover the opening in the bottom 25 of the seed box 10 to prevent unwanted discharge of the seeds. The underside of the base 20 includes a pair of wood runners 70 extending between opposing side walls 22. A substantially U-shaped slide gate frame 72 is positioned between the wood runners 70 to retain and limit lateral movement of the slide gate 30. The slide gate 30 extends through a slot in the side of the wall 22 of the base 20 to define a grasping area or handle 74 to allow the slide gate 30 to be pulled out to allow for the seeds or other contents in the base 20 to be discharged. Proximate the handle 74 is a cavity 76 that permits a latch member 80 of a lever arm 78 (see FIG. 5) to be removably positioned therein to selectively permit movement of the slide gate 30 relative to the base 20. A raised area or retaining member (not shown) may be positioned on the other end of the slide gate to prevent the slide gate from being fully removed during use.

Industry practice typically requires seed producers or sellers to provide credit to customers for any unused seed boxes upon their return. However, once the seed boxes are sold and enter the channels of trade (e.g., to regional seed dealers and/or to the end-user farmers), seed producers often have difficulties in quickly and accurately determining the quantity of seed that is returned by a customer. Therefore, seed producers are often left to make educated guesses about how much seed is returned and the amount that needs to be credited to the consumer. This process leads to overpayments and unreliable information as to usage rates for future forecasts, planting and sales.

There is therefore a need for a system and method that permits seed producers to better track their seed boxes and their usage throughout the supply cycle.

BRIEF SUMMARY OF THE INVENTION

The present invention comprises a system and method for monitoring the location and usage of seed boxes. Seed boxes may include the monitoring system when manufactured or may be retrofitted with the monitoring system. The monitoring system includes a sensor that detects when the slide gate is opened to discharge the seeds contained within the seed box. One embodiment of the sensor is a magnetic sensor that includes a magnet or magnetic strip that may be attached to the seed box slide gate and a magnetic switch that attaches to the seed box. A GPS unit may be installed within the seed box to detect and transmit information on the location of the seed box. The GPS unit may include a battery that powers the GPS unit and the magnetic switch or the monitoring system may include a separate power source.

The system also may utilize a RFID/barcode label on the seed box that can store information on, among other things, the particular type of seeds contained therein. When the seed box is filled, information on the seeds is scanned along with the label and then stored in a database in the cloud or other system or server.

In operation, the corresponding components of the magnetic sensor may be attached to the inside of the slide gate and the wall of the seed box so that when the slide gate is in the closed position, the components detect one another. The sensor may communication with the GPS unit wirelessly (e.g., Bluetooth) or through wires that may extend through holes in the ribbing to connect to the battery of the GPS unit or other power supply. Once the particular seed is selected or placed within the seed box, that information may be stored on an RFID or barcode label that also can include information on the particular seed box.

When the slide gate is opened to release the seeds, the magnet is moved out of engagement with the corresponding switch. When the magnet is not detected for a period of time or when a magnetic field is detected, the slide gate is considered to be in an open position, wherein the sensor will transmit such information to the GPS unit. The GPS unit preferably automatically transmits GPS information as well as information on whether the contents have been discharged (and thus sold to the consumer) at a set time or interval to a remote server or system to provide updated information on the location and status of the seed box. In addition, the GPS device may scan for additional sensors on other seed boxes within a selected range or area to receive information on the status of the contents of multiple seed boxes for transmission and reporting. Once information from the GPS unit is received, information about the seed box and its contents may be obtained from the database.

At the end of the growing season, information collected from the seed boxes may be aggregated to provide information on the number and types of seeds sold by geographic areas. This information may be utilized to help make more accurate forecasts of future usage rates.

Accordingly, it is an object of the present invention to provide a system and method that permits the more efficient and economical tracking and monitoring of seed boxes and their contents.

It is another object of the present invention to provide a system and method for tracking the location and usage of seeds to forecast geographic usage rates.

There is still yet another object of the present invention to provider for a system and method that permits the more efficient management of seed inventory.

Other objects, features and advantages of the invention will be apparent from the following detailed disclosure, taken in conjunction with the accompanying sheets of drawings, wherein like reference numerals refer to like parts.

DETAILED DESCRIPTION OF THE INVENTION

Figure 1:
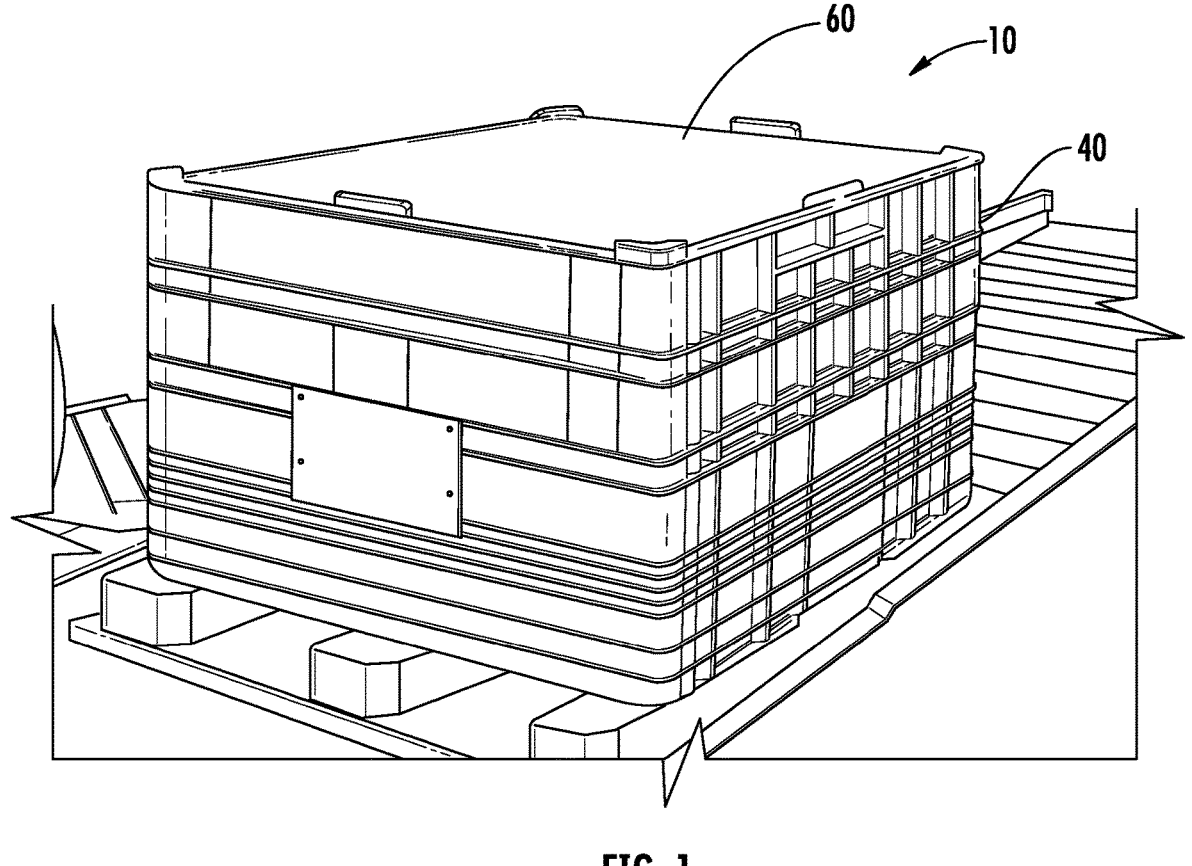
FIG. 1 is a front perspective view of a prior art seed box in a nested position.
Figure 2:
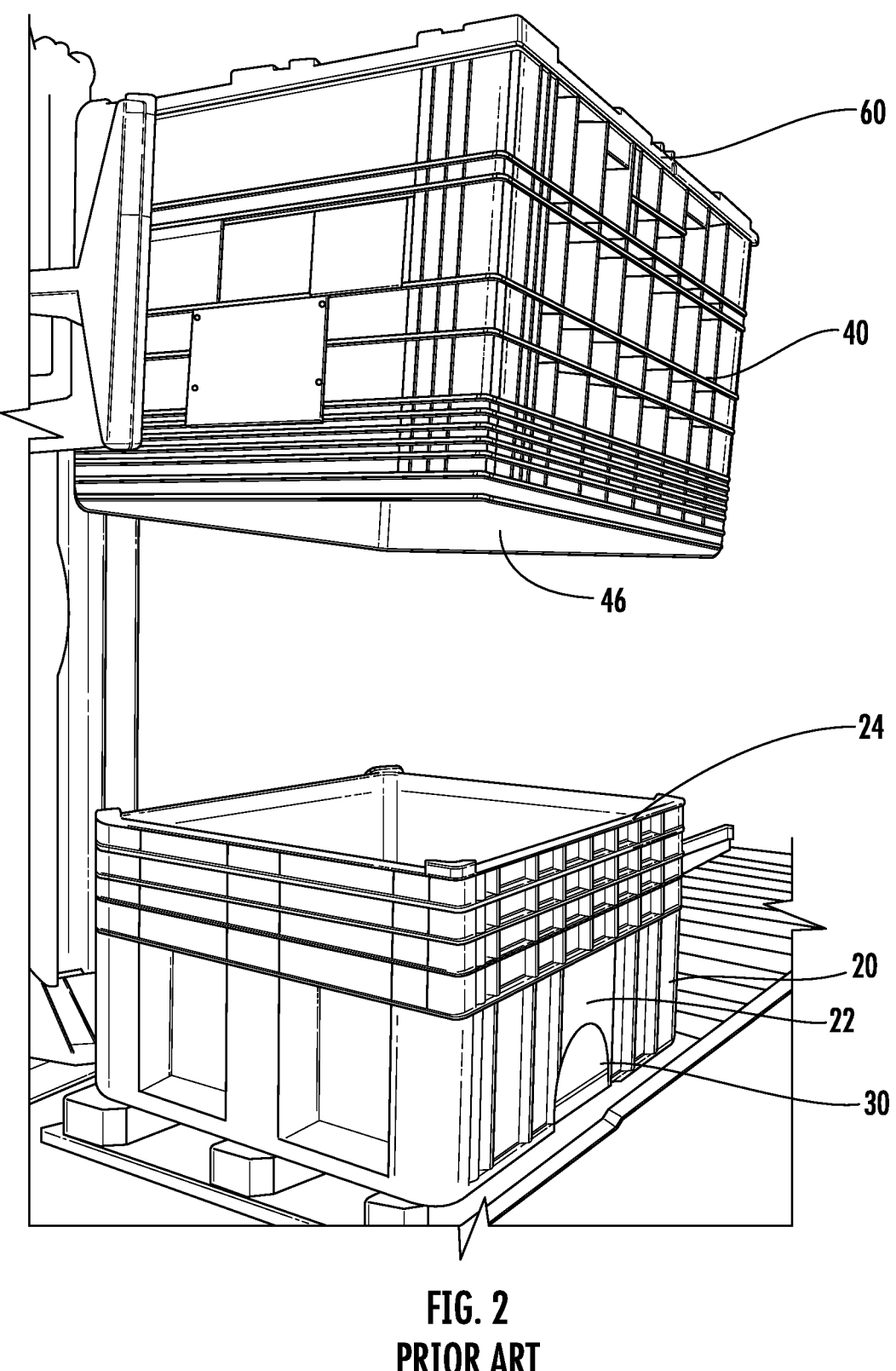
FIG. 2 is a front perspective view showing the ring of the seed box of FIG. 1 being lifted up.
Figure 3:
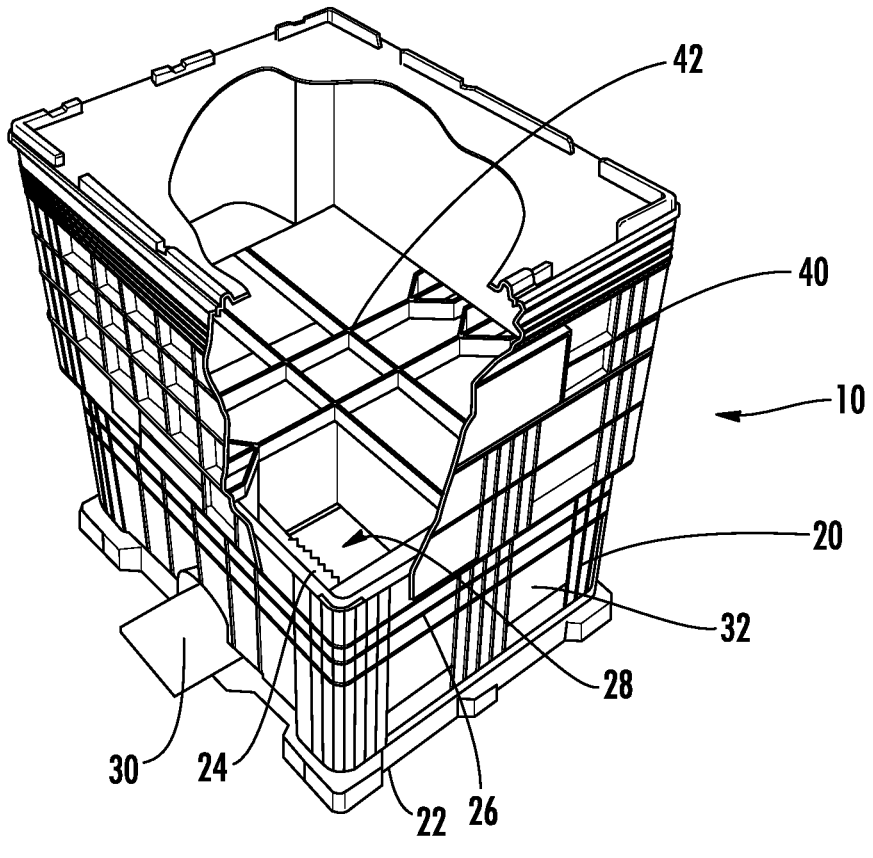
FIG. 3 is a top perspective partial view of the seed box of FIG. 1 in a stacked position.
Figure 4A:
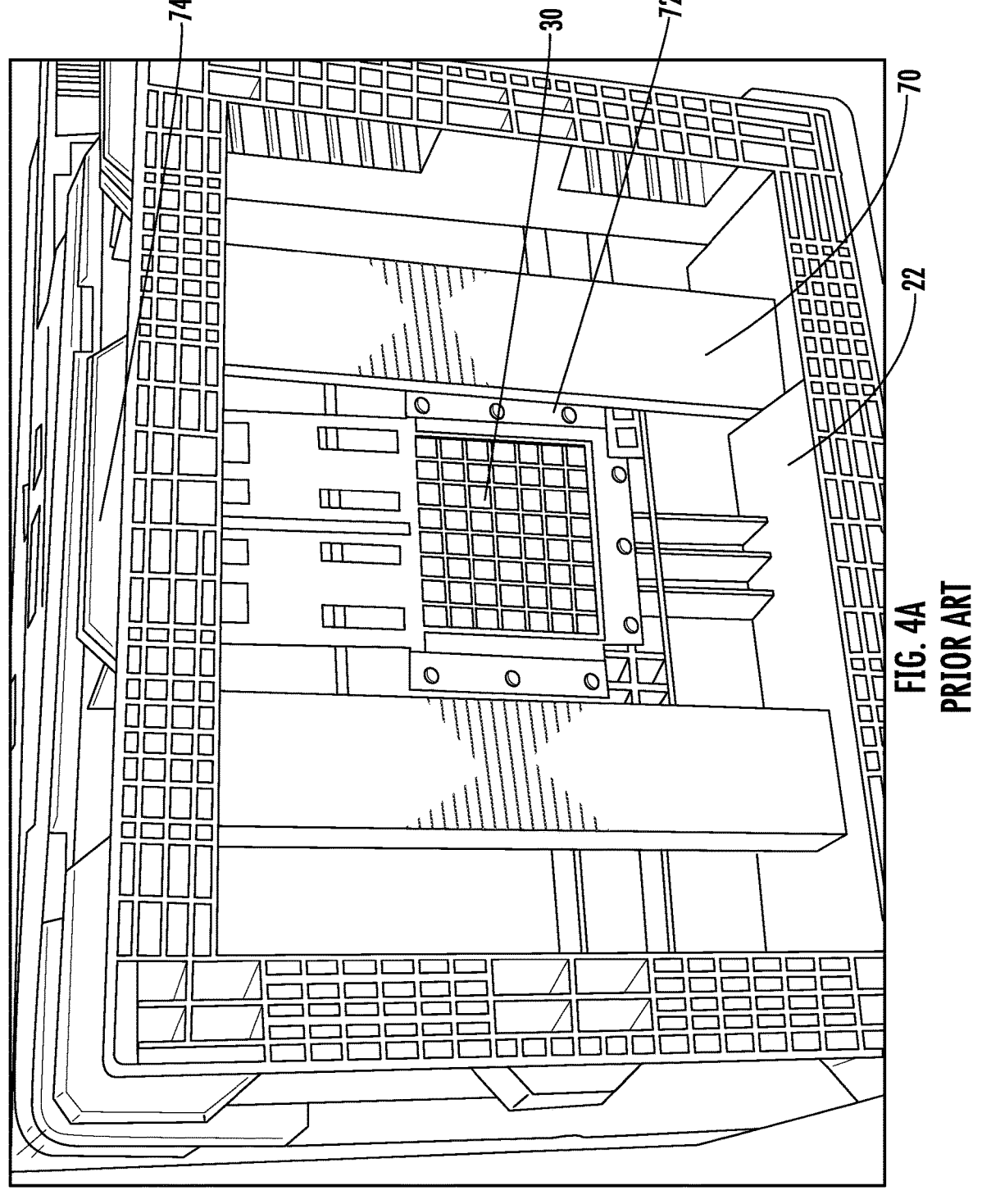
FIG. 4A is a bottom view of a prior art seed box showing a slide gate in the closed position.
Figure 4B:
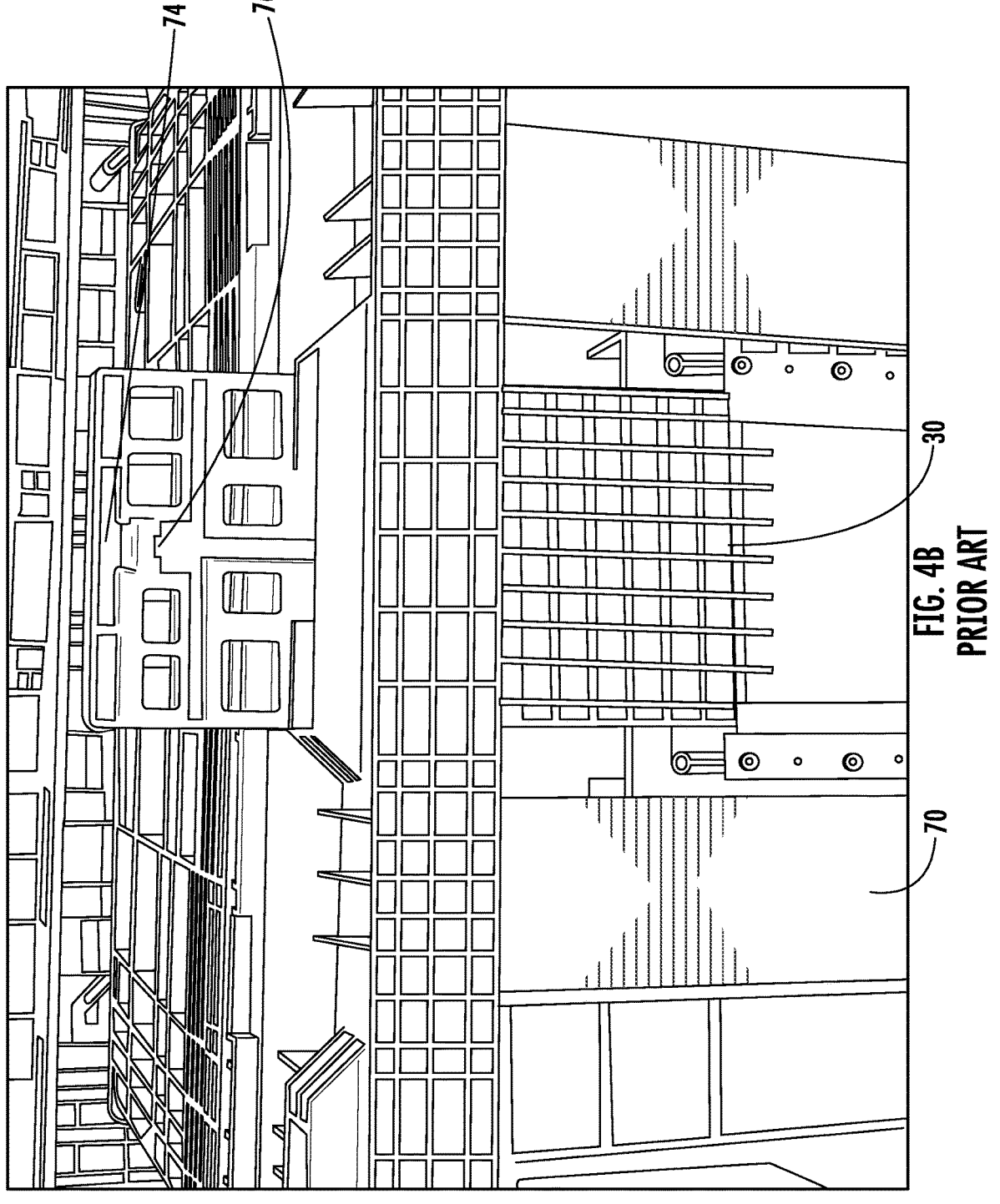
FIG. 4B is a bottom perspective view of a prior art seed box showing the slide gate in the opened position.

While this invention is susceptible of embodiment in many different forms, there is shown in the drawings and will herein be described in detail several specific embodiments, with the understanding that the present disclosure is to be considered merely an exemplification of the principles of the invention and the application is limited only to the appended claims.

FIGS. 5 through 8 illustrate one embodiment of the monitoring system 100 of the present invention. The monitoring system generally comprises a sensor 102 associated with the slide gate 30 to determine when the slide gate 30 is in the open position, a GPS unit 104 and cabling 106 to connect the GPS unit to the sensor 102.

Figure 5:
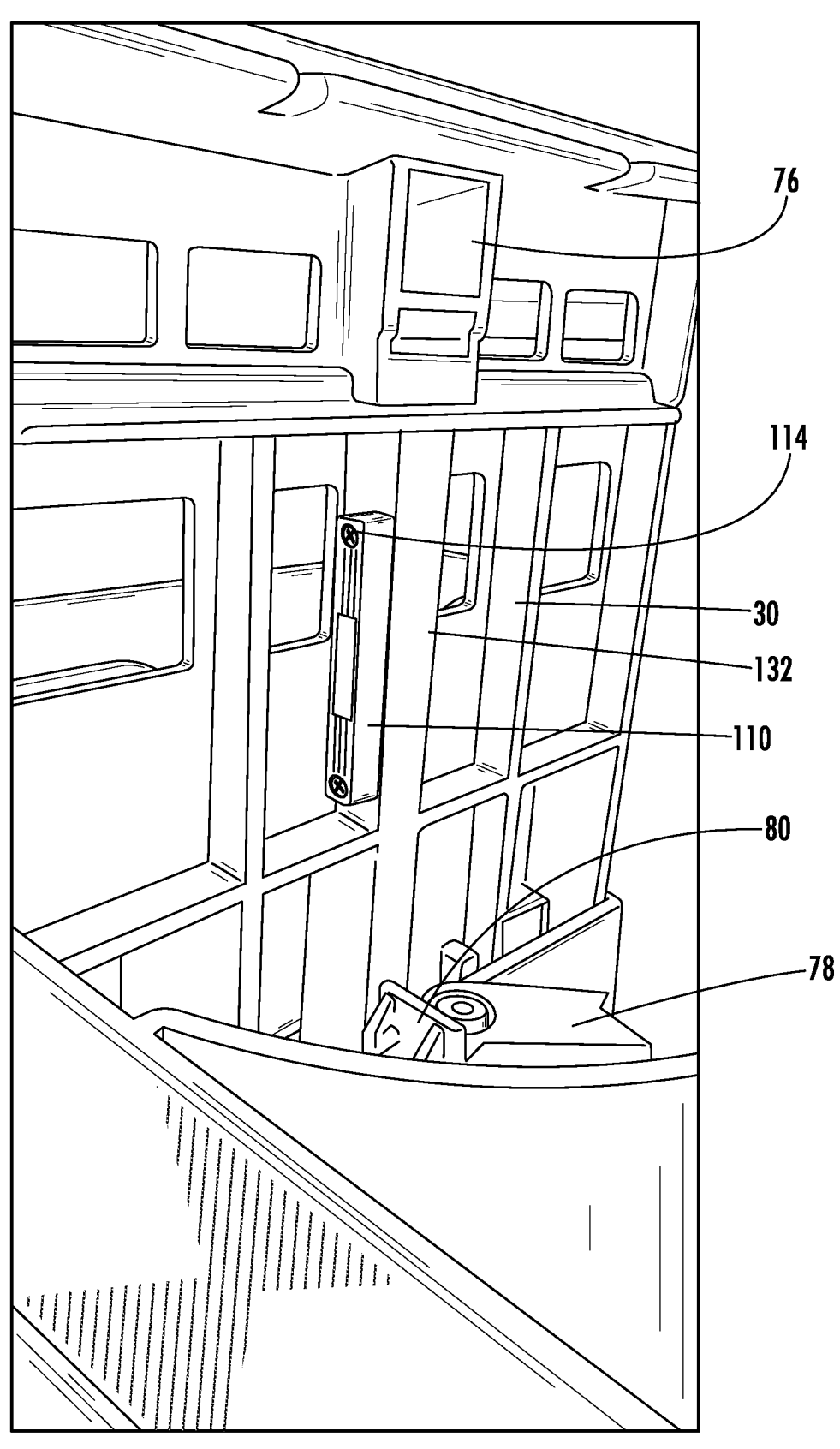
FIG. 5 is a partial bottom perspective view of a seed box showing attachment of a magnet of the present invention to the slide gate.
Figure 6:
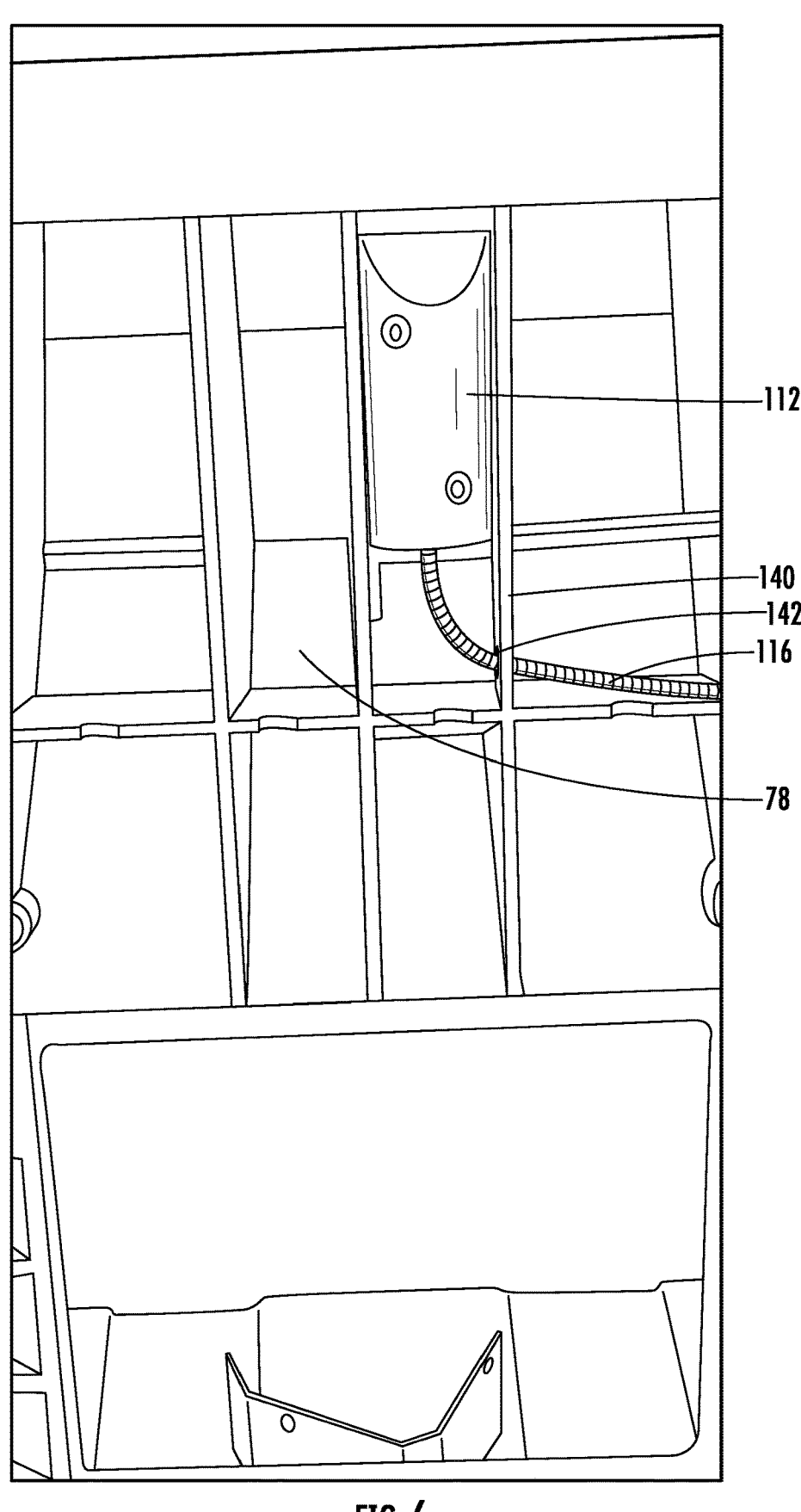
FIG. 6 is a partial bottom perspective view of a seed box showing a magnetic switch of the present invention mounted within the interior ribbing of the seed box.
Figure 7:
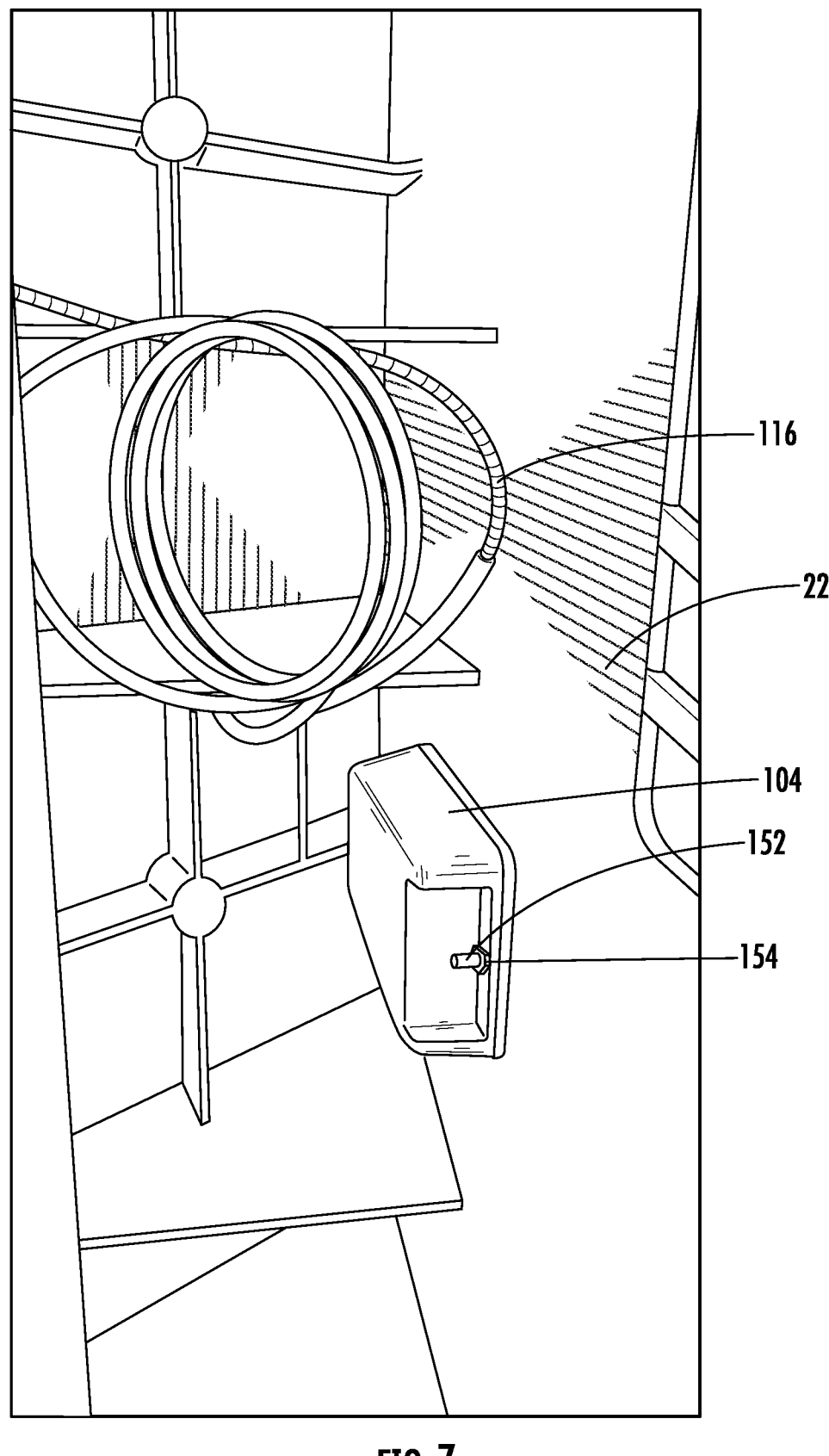
FIG. 7 is a partial perspective view of a seed box showing a GPS unit of the present invention mounted therewithin.
Figure 8:
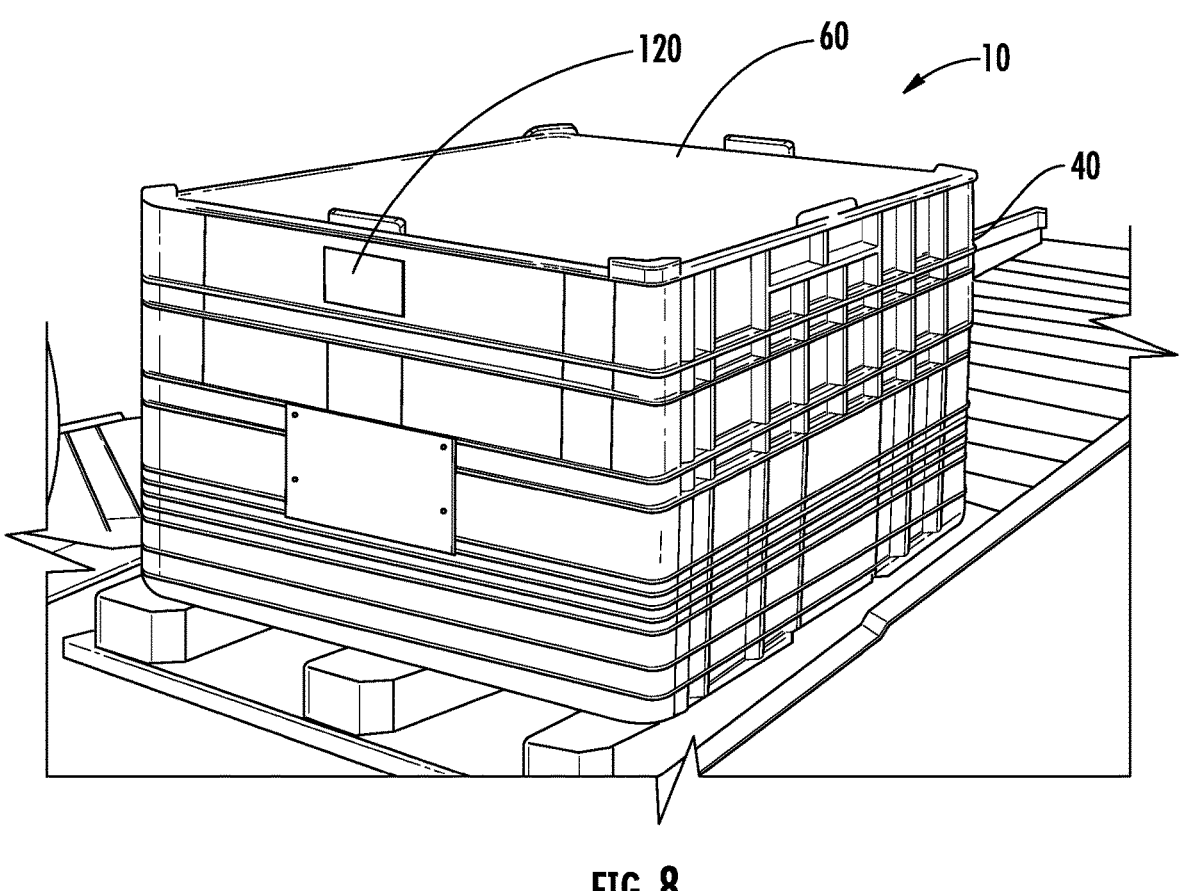
FIG. 8 is a perspective view of a seed box showing a label of the present invention attached thereto.

The sensor 102 shown in FIGS. 5 and 6 is a magnetic sensor comprising a magnetic strip or plate 110 and a magnetic switch 112. The magnetic strip 110 may be attached to the ribbing 132 of the slide gate 30 using a pair of self tapping screws 114 or other known means. Referring to FIG. 6, the magnetic switch 112 may be attached to the ribbing 140 on the inside of the bottom 25 of the base 20 so that it is proximate to the magnetic strip 110 to detect when the slide gate 30 is in the closed position. The magnetic switch 112 may be attached directly to the ribbing 140 or to a mounting plate or bracket positioned and secured within the opening defined by the ribbing 140. The sensor preferably has a unique identifier 103 (e.g., number or alphanumeric string) that is recorded and stored in the database in the remote system 124 to associate it with the particular seed box 10. Examples of magnetic sensors that may be utilized are the industrial magnetic contact switches from Seco-Larm U.S.A., Inc or ELA Innovation. It is appreciated that other types of sensors to monitor the status of the gate and discharging of the contents of the seed box may be utilized and not depart from the scope of the present invention.

An armored cable 116 may be used to house and protect wire leads (not shown) to connect the magnetic switch 112 to a power source. The armored cable may extend through openings 142 within the ribbing 132, 140 to keep the cable 116 from interfering with the operation of the seed box 10.

While a variety of power sources may be utilized, in one embodiment, the GPS device or unit 104 may include a battery therewithin. The battery may be used to power the magnetic sensor 102 and the GPS unit 104. The GPS unit 104 may be attached to the inside part of the base side wall 22, such as in one of the pockets defined by ribbing, using bolts or screws 152 and nuts 154, adhesives or other known means. One or more male plugs or connectors (not shown) may extend from the GPS unit 104 to receive the wire leads of the armored cable 106 or connectors to an outside power source to charge the battery. Alternatively, the sensor may include its own power source and communicate wirelessly with the GPS unit (e.g., via Bluetooth).

The GPS unit 104 has a unique identifier 105 such as, but not limited to, an identifying number or alphanumeric string to allow it to be readily identified. The identifier is preferably recorded in the database in the remote system to associate the particular GPS unit with a particular seed box. To allow information from the GPS unit 104 to be sent to a remote server or system 124 through a cellular network or other known means, the GPS unit 102 also includes a transceiver or transmitter 109. The GPS unit may provide real-time updates, or send updates at set times or intervals, on the location of the seed box to provide information on where it travels and where it discharges the seeds. It is appreciated that the GPS unit 104 may be set to scan for one or more sensors (as disclosed below) within a set area on a daily basis or any other desired times or time intervals to provide periodic updates on the status of the seed boxes and their contents. An example of a GPS unit that may be used is the Wired 425I4G Weatherproof Hardwired GPS Tracker by Logistimatics.

It is appreciated that the monitoring system 100 may be built into a seed box base 20 or may be installed on an existing base 20. The monitoring system 100 may be installed by first removing the wood runners 70 and slide gate 30 from the base 20. The magnetic strip 110 may then be attached to the ribbing 132 of the slide gate 30 using self tapping screws 114 or other known connectors or attaching methods. The magnetic switch 112 is installed within the ribbing 140 of the base 20 so that the magnetic switch 112 is within the prescribed range (e.g. one inch) to detect the magnetic strip 110 when the slide gate 30 is in the closed position. The switch may be attached directly to the ribbing or to a plate or bracket positioned and attached to the bottom or within the ribbing.

Holes 142 may be drilled in the ribbing 140 to allow the armored cable 116 to pass therethrough to connect the magnetic switch 112 to the power source within the GPS unit 104. The GPS unit 104 may be attached to the side wall 22 using nuts 154 and bolts 152 or other known connecting means. Once the GPS unit 104 is secured and connected to the magnetic switch 112, the wood runners 70 and slide gate 30 may be re-attached to the base 20. It is appreciated that the sensor may have its own power source or be connected to a separate power source other than the GPS unit.

RFID or barcode labels or tags 120, or other labeling or means to store and provide information, may be attached to the base 20 or other component of the seed box 10 to provide information on the contents of the seed box 10. The RFID label or tag may be attached using any known means including, but not limited to, screws or adhesives.

The RFID label 120 preferably has it own unique identifier 122 such as, but not limited to, an identifying number or alphanumeric string. When a seed box is filled, information on the particular seeds being stored along with the label may be scanned and stored in a database in the cloud or other server or system 124. The RFID label may include information on, among other things, the contents of the particular seed box 10. The RFID label may then be scanned and stored in the database and linked with the identifiers 103 and 105 of the sensor 102 and GPS unit 104.

Figure 9:
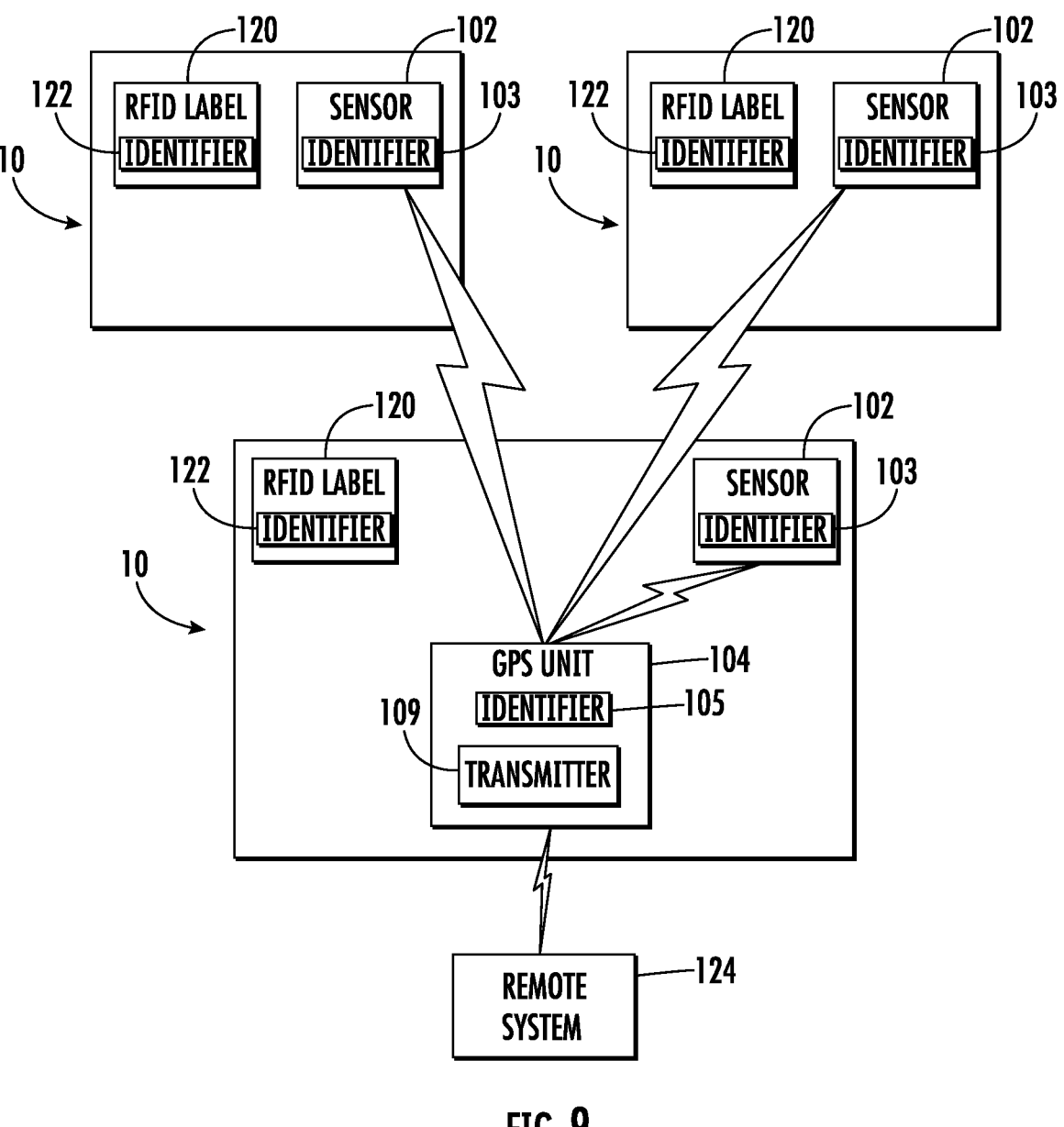
FIG. 9 is a schematic diagram illustrating a plurality of seed boxes of the present invention in communication with each other and a remote system.

When the magnetic strip 110 is detected by the magnetic switch 112, the slide gate 30 is considered in the closed position. When the magnetic strip 110 is not detected by the magnetic switch 112 for a period of time (e.g. 10 seconds), the slide gate 30 is considered to be in the open position, wherein the magnetic switch 112 sends a signal or notification to the GPS unit 104, which then transmits an update on the status of the seed box 10, which can include its current location, to the remote monitoring server or system 124. Once the slide gate 30 is closed and the magnetic strip 110 is again detected by the magnetic switch 112, the magnetic switch 112 may send another notice to the GPS unit 104 to relay that the seed box 10 is now empty. As shown in FIG. 9, it is appreciated that a single GPS unit may obtain information from a plurality of sensors on a plurality of seed boxes in a particular designated area (e.g., within a truck's cargo hold).

Once information is received that a seed box is empty, the database may be queried to obtain information on the associated seed box and particular seeds that were stored and discharged. The monitoring system thus permits seed producers or other suppliers of the boxes to accurately determine and calculate the usage information for their boxes. This information may be used to more accurately calculate payments and credits for the amount of product used, while also serving as data for making more accurate forecasts of usage rates by geographic areas.

It will be understood that modifications and variations may be effected without departing from the spirit and scope of the present invention. It will be appreciated that the present disclosure is intended as an exemplification of the invention and is not intended to limit the invention to the specific embodiment illustrated and described. The disclosure is intended to cover, by the appended claims, all such modifications as fall within the scope of the claims.

The invention claimed is:

1. A usage monitoring system for a seed box and its contents that sends information on the status of the seed box to a remote system, the system comprising:
   a seed box base having side walls and a bottom defining a compartment for storing seeds, the bottom including an opening for discharging the seeds;
   a slide gate that moves between a closed position and an open position to selectively uncover the opening to discharge the seeds;
   a sensor to detect when the slide gate is in the open position; and
   a transmitter for sending information on the position of the slide gate to the remote system.

2. The system of claim 1 wherein the sensor is a magnetic sensor.

3. The system of claim 2 wherein the magnetic sensor comprises a magnet attached to the slide gate and a magnetic switch attached to the seed box base.

4. The system of claim 3 which further comprises a GPS unit.

5. The system of claim 4 wherein the GPS unit includes a battery and wherein the system further comprises an electrical connector to connect the sensor to the battery.

6. The system of claim 4 which further comprises a label storing information on the contents.

7. The system of claim 4 wherein the sensor is wirelessly connected to the GPS unit.

8. The system of claim 1 which further comprises a GPS unit.

9. The system of claim 8 wherein the GPS unit includes a battery and wherein the system further comprises an electrical connector to connect the magnetic switch to the battery.

10. The system of claim 1 which further comprises a label storing information on the seed box and its contents.

11. The system of claim 10 wherein the label is an RFID label.

12. A usage monitoring system for a seed box and its seeds that sends information on the status of the seed box to a remote system, the system comprising:
   a seed box base having side walls and a bottom defining a compartment for storing seeds, the bottom including an opening for discharging the seeds;
   a slide gate that moves between a closed position and an open position to selectively uncover the opening to discharge the seeds;
   a sensor to detect when the slide gate is in the open and closed positions;
   a GPS unit that is operatively connected to the sensor to receive information on the status of the position of the slide gate to indicate when the seed box is empty, wherein the GPS has a unique identifier;
   a transmitter for sending information on the GPS unit unique identifier, whether the seed box has been emptied and the location of the seed box to the remote system; and
   a label storing information on the seed box and the seeds.

13. The system of claim 12 wherein the sensor is a magnetic sensor.

14. The system of claim 13 wherein the magnetic sensor comprises a magnet attached to the slide gate and a magnetic switch attached to the seed box base.

15. The system of claim 12 wherein the GPS unit includes a battery and wherein the system further comprises an electrical connector to connect the sensor to the battery.

16. The system of claim 12 wherein the label is an RFID label.

17. The system of claim 12 wherein the sensor is wirelessly connected to the GPS unit.

18. The system of claim 17 wherein the system comprising a plurality of seed boxes each having a sensor to detect when the slide gate is in the open and closed positions, and wherein the sensors of the plurality of sensors can wireless transmit information on whether the seeds in the seed box have been emptied.

19. The method of claim 18 which further comprises the step of attaching a label to the seed box that stores information on the types of seeds stored within the seed box.

20. The method of claim 19 wherein the magnetic sensor comprises a magnet attached to the slide gate and a magnetic switch attached to the seed box base.

21. The method of claim 19 herein the sensor has a unique identifier, the GPS unit has a unique identifier and the label has a unique identifier, and wherein the method further comprises the step of storing the GPS unique identifier, the sensor unique identifier and the label unique identifier in a database.

22. The system of claim 12 wherein the sensor has a unique identifier and the label has a unique identifier, and the system further comprises a database that stores the GPS unit identifier, the sensor identifier and the label identifier.

23. The method of claim 22 wherein the sensor wirelessly communicates with the GPS unit.

24. The method of claim 22 wherein the sensor is a magnetic sensor.

* * * * *